(12) United States Patent
Jian et al.

(10) Patent No.: US 6,199,072 B1
(45) Date of Patent: Mar. 6, 2001

(54) METHOD FOR CREATING ARCHIVES ON REMOVABLE MASS STORAGE MEDIA AND ARCHIVE SERVER

(75) Inventors: Zhimin Jian; Zhong Tian, both of Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/910,159

(22) Filed: Aug. 13, 1997

(30) Foreign Application Priority Data

Nov. 8, 1996 (CN) ............................................. 96 1 14525

(51) Int. Cl.[7] ...................................................... G06F 9/00
(52) U.S. Cl. ............................................ 707/204; 707/103
(58) Field of Search ........................................ 707/1–225

(56) References Cited

U.S. PATENT DOCUMENTS 4,965,753 * 10/1990 Kraemer ................................ 395/121
5,305,438 * 4/1994 MacKay et al. ...................... 345/911
5,782,642 * 7/1998 Goren ............................... 434/307 R
5,805,289 * 9/1998 Corby .................................. 356/376

* cited by examiner

Primary Examiner—Thomas G. Black
Assistant Examiner—John G. Mills, III
(74) Attorney, Agent, or Firm—Khanh Q. Tran; Altera Law Group, LLC

(57) ABSTRACT

A method for creating archives on removable mass storage media, comprising steps of: digitizing data to be archived into digitized archives; extracting record information representing details about the archives; storing the record information in archive directory files; and storing the digitized archives and archive directory files onto the removable mass storage media. Also described is a digital archive server for loading archives created by the method of the invention. The server reads the archive directory files and loads them into the database of the digital library.

3 Claims, 5 Drawing Sheets

| | |
|---|---|
| 2011 — The number of archive types (m); | \n |
| Suggestion for filing of archives of the first type; | \n |
| The number of record items of archives of the first type (m1); | \n |
| Name of the first record item of archives of the first type; | \n |
| ... | ... |
| Name of the m1th record item of archives of the first type; | \n |
| Suggestion for filing of archives of the second type; | \n |
| The number of record items of archives of the second type (m2); | \n |
| Name of the first record item of archives of the second type; | \n |
| ... | ... |
| Name of the m2th record item of archives of the second type; | |
| ... | ... |
| Suggestion for filing of archives of the mth type; | \n |
| The number of record items of archives of the mth type (mm); | \n |
| Name of the first record item of archives of the mth type; | \n |
| ... | |
| Name of the mmth record item of archives of the mth type; | \n |
| 2013 — The number of archives (i.e., the number of entries k); | |
| The first entry; | |
| The second entry; | |
| ... | |
| The kth entry; | |
| EOF (file trailing character) | |

Groupings: 2011, 2012 (containing m1, m2, mm), 2013 form section 201; entries form section 202; EOF forms 203.

*Fig. 2*

| Type number of this archive; | \n | |
|---|---|---|
| The first item; | | |
| The second item; | | |
| ... | | |
| The nth item; | | |
| File name of entry archive body (including path name) | \n | |

*Fig. 3*

| Content of item. | \n |
|---|---|

*Fig. 4*

METHOD FOR CREATING ARCHIVES ON REMOVABLE MASS STORAGE MEDIA AND ARCHIVE SERVER

FIELD OF THE INVENTION

The present invention relates to a method for creating digitized archives on removable mass storage media used in digital libraries, and to a digital archive server for loading digitized archives on removable mass storage media into databases of digital libraries.

BACKGROUND OF THE INVENTION

A digital library is an important part of the "information highway". In general, a digital library includes several components such as a network, a database server, mass storage, and user interfaces. Usually, an archive material is entered into a digital library by the following steps:

1. digitizing the archive material by manual entering, photoelectric recognition, electronic scanning, digital sound and image recording, etc.;
2. storing the digitized archive material into a mass storage pool of the digital library; and
3. extracting record items associated with the archive material and physical or logical addresses of the digitized archive material on the mass storage media of the digital library, and loading the record items and physical or logical addresses into databases of the digital library.

Once an archive has been entered into a digital library, readers or users will be able to obtain required materials by accessing the digital library via the computer terminals connected to the network.

Nowadays, in the "information highway" environment, information is exchanged mainly by means of removable mass storage media used as physical carriers, apart from direct transmission using networks. At the present time, CD-ROM is one of the most important media. In a digital library, text, photographs, movies, music and other archive materials are usually digitized and stored on CD-ROMs, forming CD-ROM archives. However, CD-ROM archives have the following problems:

1. The formats in which the archives are recorded on CD-ROMs are inconsistent with each other;
2. On CD-ROMs there is no index information for each archive; and
3. CD-ROM archives have to be loaded into database management systems of electronic digital libraries manually.

As a result, a large quantity of manpower, material resources and time will be wasted while CD-ROM archives are loaded into databases of digital libraries. Also, CD-ROM archives prepared for one particular digital library can be used only in that system. If CD-ROM archives prepared specially for one digital library are to be used in another digital library, these CD-ROM archives have to be loaded into databases manually. Thus, the distribution and exchange of CD-ROM archives are greatly hindered.

SUMMARY OF THE INVENTION

The first objective of the present invention is to provide a method for creating digitized archives on removable mass storage media.

The second objective of the present invention is to provide a digital archive server for loading digitized archives on removable mass storage media into databases of a digital library.

For achieving the first objective, the present invention provides a method for creating digitized archives on removable mass storage media, comprising the steps of: digitizing archives into digitized archives; extracting record information of the archives; and storing the digitized archives and the record information onto removable mass storage media.

For achieving the second objective, the present invention provides a digital archive server for loading digitized archives from removable mass storage media into databases of digital libraries. The digital archive server comprises:

means for reading record information stored on the removable mass storage media; and means for loading said record information into the database tables of the digital library.

According to the method of the present invention, the formats in which digitized archives are recorded on removable mass storage media can be unified so that digitized archives on removable mass storage media can be exchanged among digital libraries. With the archive server of the present invention in digital libraries, digitized archives on removable mass storage media can be automatically loaded into database management systems of digital libraries, thus greatly reducing the required manpower, material resources and time.

Other advantages and features of the present invention will be more apparent through the following description in detail with reference to the accompanied drawings.

BRIEF DESCRIPTION OF THE DRAWING

FIG. 2 is a file format of the optical disk archive directory files used in the method and archive server of the present invention;

FIG. 3 is a format of a record entry contained in the file of the format shown in FIG. 2;

FIG. 4 is a format of an archive item contained in an entry of the format shown in FIG. 3;

PREFERRED EMBODIMENT OF THE INVENTION

An embodiment of the present invention is now described in detail in conjunction with the accompanied drawings.

The removable mass storage media adopted in the present invention may be CD-ROM, PD, CD-R and DVD, etc. As for these storage media of different types, the method and archive server of the present invention can be used on the same principle. Hereafter, the CD-ROM media is used exemplarily for illustration only, without imposing any restriction on the present invention.

Figure 1:
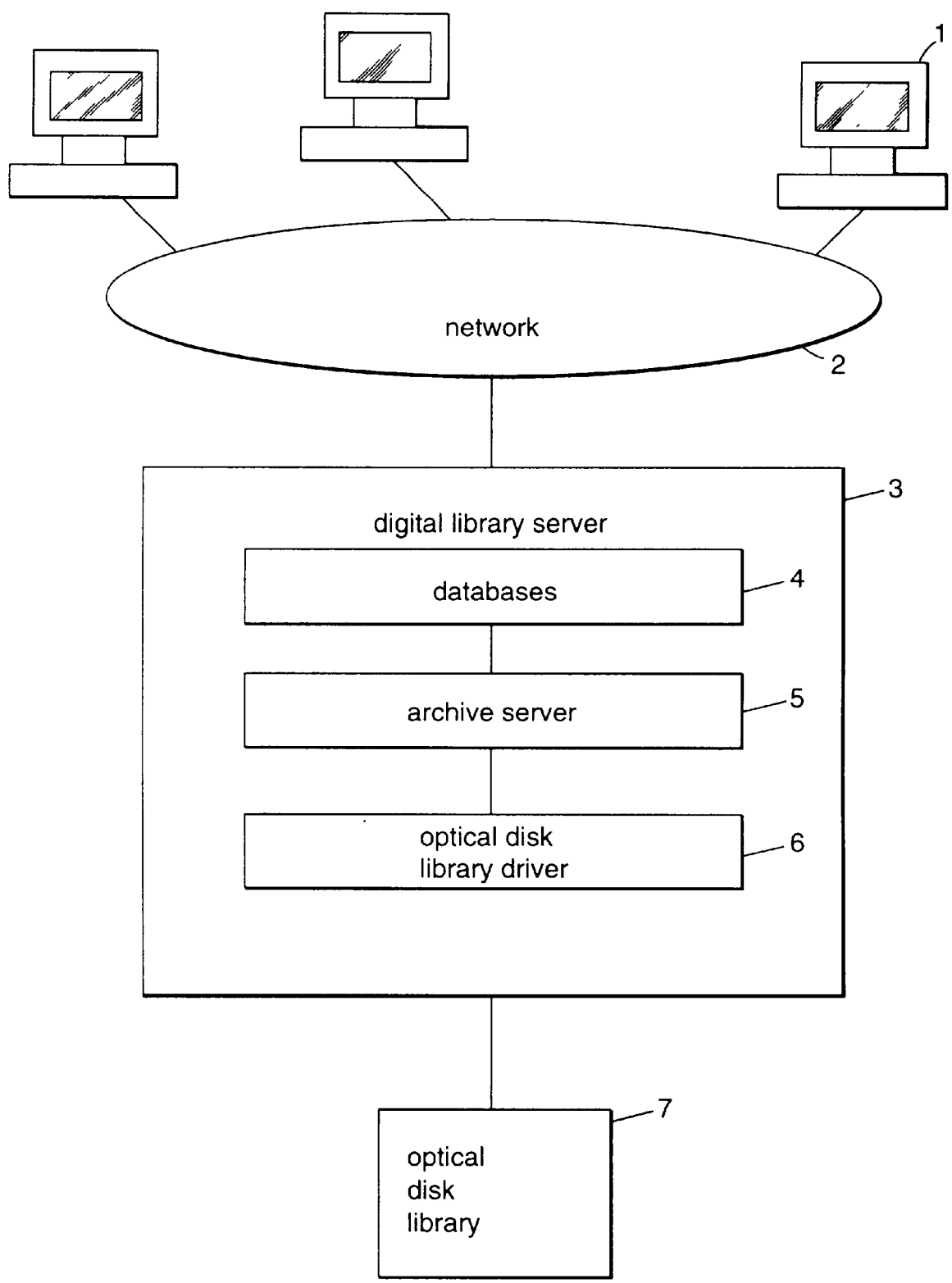
FIG. 1 illustrates an application of an archive server of the present invention in a conventional digital library.

FIG. 1 is an exemplary schematic diagram of an application of an archive server of the present invention in a digital library. Numeral 1 indicates user terminals. The user terminals 1 communicate with a digital library server 3 through a network 2. The digital library server 3 includes databases 4, an archive server 5 of the present invention, and an optical disk bank driver 6. The digital library server 3 interfaces with a mass storage pool 7 (such as an optical disk bank in this example) for storing the digitized archives.

There are many optical disks in the optical disk bank 7, and each of the optical disks contains two parts, i.e., optical disk header and optical disk body. The optical disk header includes a group of optical disk archive directory files, which are summaries and outlines of the optical disk archives. The format of the archive directory files will be described later with reference to FIGS. 2, 3 and 4. The optical disk body includes of a group of digitized archive files. The contents of the above-mentioned two parts are created by using the method of the present invention.

In response to a command from the archive server 5, the optical disk driver 6 selects an optical disk from the optical disk bank 7, reads the optical disk archive directory files in the optical disk header, and loads the archive record information and the address information of corresponding digitized archives contained in the directory files into databases 4. In the architecture as shown in the figure, archive server 5 is located between databases 4 and optical disk bank driver 6. The flow chart of the operation of archive server 5 will be explained in detail below with reference to FIG. 6.

FIG. 2 shows a file format of the optical disk archive directory files used in the method and archive server of the present invention. An optical disk archive directory file is an archive entry set file which is created during an optical disk recording. This directory file indicates various optical disk record entries and their sequential orders in the file. This file is a tool providing the basis for automatic entry of optical archives into digital libraries for retrieval. In general, for the convenience of batch creation of the digitized archives and full use of the optical disk storage capacity, a group of archive directory files and corresponding digitized archives are formed on the optical disk.

An optical disk archive directory file consists of three parts: a file header 201, a file body 202 and a file trailing character 203, as shown in FIG. 2.

The file header 201 includes the number of archive types 2011 involved in this directory file, respective explanation of the information of the archive of each type 2012, and the number of archives 2013 to which this directory file relates. The explanation of the information of the archive of each type includes proposals for filing the archives of this type (i.e., the record information in the databases), the number of record items of archives of this type, and the names of record items of all the archives of this type.

As shown in FIG. 2, file header 201 also comprises:

the the number of types of archives indicated by this archive directory file (m), \n the proposals for filing archives of the first type, \n the number of the record items of the archive of the first type (ml), \n the name of the first record item of the archive of the first type, \n

. . .

the name of the m1-th record item of the archive of the first type, \n the proposals for filing archives of the second type, \n the number of the record items of the archive of the second type (m2), \n the name of the first record item of the archive of the second type, \n

. . .

the name of the m2-th record item of the archive of the second type, \n the proposals for filing archives of the m-th type, \n the number of the record items of the archive of the m-th type (mm), \n the the name of the first record item of the archive of the m-th type, \n

. . .

the name of the mm-th record item of the archive of the m-th type, \n the number of the archives indicated by this archive directory file (i.e., number of record entries k).

File body 202 includes of a group of archive entries, the number of which equals to that of the archives 2013. The format of each of the entries will be explained later with reference to FIG. 3.

File trailing character 203 is an ASCII code EOF (end of file).

As shown in the FIG. 2, in the file header 201 at the end of each item there is a character "\n" indicating the end of a line. The character "\n" has different meanings for different operating systems. For example, it represents two characters, i.e., carriage return and line feed, in MS-DOS based systems, and represents a single character of carriage return in UNIX based systems. The "\n" hereafter has the same meaning as above.

FIG. 3 is a format of an archive entry in the file body 202 of FIG. 2. Optical disk record entry is the result of single file recording, which shows the record items and their sequential orders. As shown in the figure, each entry includes three parts, that is, the type number of this archive, all the items to which this archive relates, and the file name of the entry archive body (including path name).

FIG. 4 is a format of an item contained in FIG. 3. The optical disk's archive record items, which are selected on the basis of the easy-to-read and hard-to-write behaviors of optical disk, can fully reveal the contents and features of the archives and are convenient for retrieval. They indicate the name, the content and the sequential order of each record item. As shown in FIG. 4, each item is a byte stream representing the contents of an optical disk record item, ended with "\n".

Figure 5:
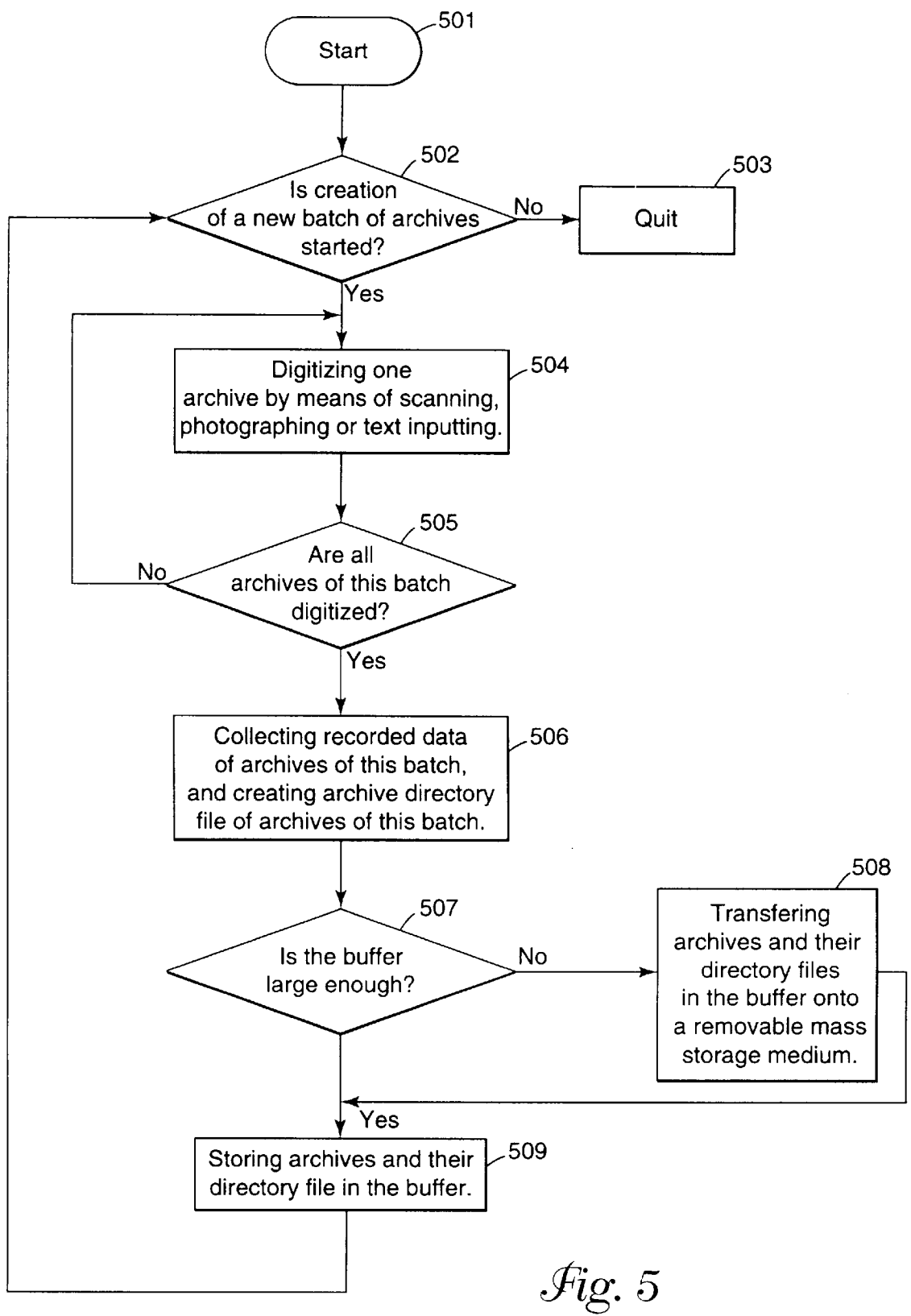
FIG. 5 is a flow chart illustrating a method for creating digitized archives on removable mass storage media according to the present invention.

FIG. 5 is a flow chart of an embodiment illustrating a method for creating digitized archives on removable mass storage media according to the present invention. The embodiment starts from step 501. At step 502, the method determines whether the creation of a batch of new archives is started. If the answer is "Yes", step 504 is entered, otherwise, the process quits at step 503. At step 504, an archive is digitized by means of scanning, photographing or text inputting. The process then proceeds to step 505, where it is determined whether all the archives of this batch have been digitized. If it is determined at step 505 that all the archives of this batch have been digitized, the process proceeds to step 506, otherwise it returns to step 504. At step 506, the recorded data of this batch are collected and the archive directory files of the archives of this batch are created (a format of the archive directory file has been illustrated above with reference to FIGS. 2, 3 and 4). At step 507, the method determines whether the buffer is large enough. If the buffer is large enough, the process proceeds to step 509, otherwise it proceeds to step 508. At step 509 the archives of this batch and their corresponding directory file are stored in the buffer, then the process returns to step 502 to start the process of creating the archives of the next batch. At step 508, the archives and their corresponding directory files in the buffer are transferred onto a removable mass storage medium, and the buffer is emptied. The process then proceeds to step 509.

In the above embodiment, the buffer is a storage space on an erasable storage medium (such as a hard disk) with its capacity consistent with that of the corresponding removable mass storage medium. It is assumed that the space occupied by the archives and their corresponding directory files does not exceed the storage capacity of a removable mass storage medium.

The above embodiment can be used many times for recording a plurality of archives in batches on one and the same removable mass storage medium (such as an optical disk). A group of archive directory files are formed on this medium. This helps the read-write system of the storage medium to fully utilize the capacity of this medium.

As an example, using the above embodiment, the file name of the archive directory file formed during the first recording is DOCS.001. The file names of the archive directory files formed during the subsequent second or third recording that might take place will be DOCS.002, DOCS.003 respectively, and so forth. All those archive directory files constitute a group of archive directory files.

The following example is used for further illustrating the above-described embodiment of the method and format of archive directory files of the present invention.

Consider two news film clips. One is "Premier Zhou Visits Korea" filmed by China News File Studio in May, 1971. The other is "Plantation of Wheat" filmed by China Agriculture Film Studio in December 1980. Now these two films are to be digitized and sent into a digital library for on-line service.

Next, the digitized archives are created according to the above embodiment of the present invention.

First, these two films are digitized into two files "zhou.mpg" and "xiao.mpg" respectively by means of a digital video camera and stored in the "buffer" (assuming that the space occupied by these two files do not exceed the "buffer" size and that there is still empty space in the "buffer" for storing the archive directory file which will be created later). Then, the recorded data are collected and the archive directory file is created. Assume that the film "Premier Zhou Visits Korea" is to be recorded in database "NewsFile", whose record items are selected to be "Film Name", "Completion Date", and "Film Studio", according to the archive recording standards. Assume that the film "Plantation of Wheat" is to be recorded in database "Scientific Film", whose record items are selected to be "Film Name", "Completion Date", and "Film Studio". Note that the record items are selected according to the archive recording standards and are consistent with the field names of the corresponding database tables. In this way, the archive directory file has the contents listed below. Note that an archive directory file is a text file and the text in parentheses are explanations of the file data and do not belong to the file body.

(The start of the file)
2 \n (This archive directory file relates to two types of archives)
News film \n
   (The first type of archive is news file)
3 \n (There are three record items in the archive of the first type)
Film name \n
   (The first record item of the archive of the first type is "Film Name")
Completion Date \n
   (The second record item of the archive of the first type is "Completion Date")
Film Studio \n
   (The third record item of the archive of the first type is "Film Studio")
Scientific film \n
   (The second type of archive is scientific film)
3 \n (There are three record items in the archive of the second type)
Film name \n
   (The first record item of the archive of the second type is "Film Name")
Completion Date \n
   (The second record item of the archive of the second type is "Completion Date")
Film Studio \n
   (The third record item of the archive of the second type is "Film Studio")
2 \n (This archive directory file illustrates two archives)
   (The first entry)
Premier Zhou Visits Korea \n
   ("Film Name" of the first entry)
1971.5 \n
   ("Completion Date" of the first entry)
China News Film Studio \n
   ("Film Studio" of the first entry)
zhou.mpg (The file name of the archive body of the first entry)
   (The second entry)
Plantation of Wheat \n
   ("Film Name" of the second entry)
1980.12 \n
   ("Completion Date" of the second entry)
China Agriculture Film Studio \n
   ("Film Studio" of the second entry)
xiao.mpg (The file name of the archive body of the second entry)
   (The end of the file)
EOF (The trailing character of this archive directory file)

Assume that the first batch of archives is written into the buffer. The created archive directory file is named after "DOCS.001" and written into the buffer.

Assume further that there is no space in the buffer for storing the archives of the second batch. The contents of the buffer are then written onto a corresponding removable mass storage medium (such as a CD). Now, there are three files on this CD: DOCS.001, zhou.mpg, and xiao.mpg.

Up to now, the creation of the archives on a removable mass storage medium is finished.

Figure 6:
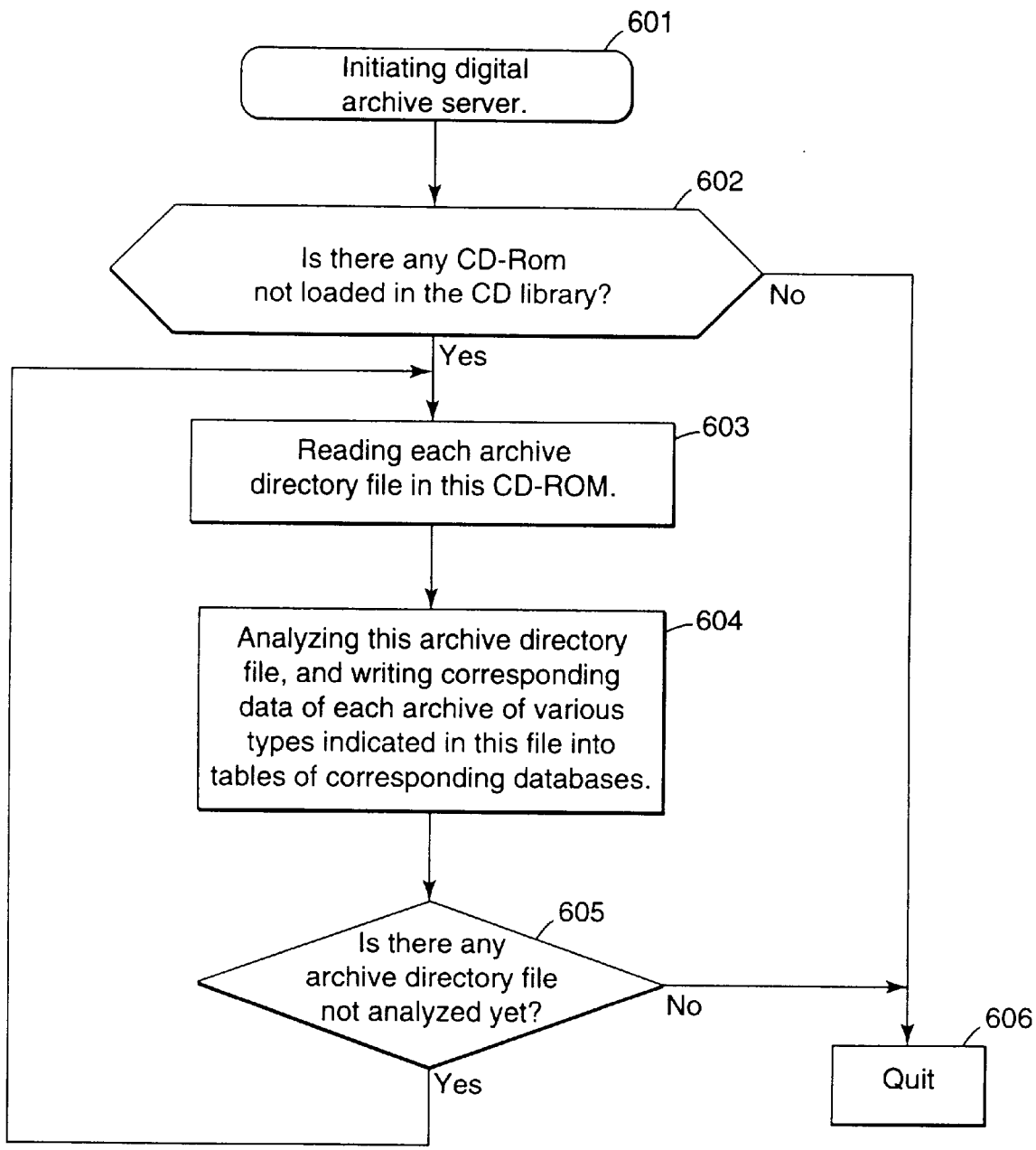
FIG. 6 is a flow chart illustrating the operation of a digital archive server according to the present invention.

FIG. 6 is a flowchart illustrating the operation of a digital archive server according to the present invention. At step 601 the digital archive server is started. At step 602 it is determined whether there are any CD-ROMs not recorded yet in the optical disk bank. If it is determined, at step 602, that there are unrecorded CD-ROMs, the process proceeds to step 603. Otherwise, the process quits at step 606. At step 603 each of the archive directory files in the CD-ROM is read. Then, at step 604, the archive directory files are analyzed one by one and the data corresponding to each archive (of various types indicated by each file) is written into the tables of corresponding databases. Subsequently, at step 605, it is determined whether there is any archive directory file that is not yet analyzed. If there are such archive directory files, the process returns to step 603. Otherwise, the recording process finishes at step 606.

Next, the above example is used to illustrate the flow chart of the above-described archive server.

First, the CD made using the above method is inserted into the optical disk bank of a digital library.

The digital archive server is initiated to begin a new recording process.

The digital archive server then searches the optical disk bank for a CD that is not recorded yet.

The digital archive server next opens the archive directory file DOCS.001 on the CD and analyzes it. The server then loads the recorded data of these two archives into the tables of "News Film" database and "Scientific Film" database in the digital library, respectively.

Finally, the digital archive server closes file DOCS.001, thus finishing the process of loading the archives into the digital library.

While the method for creating archives on removable storage media and archive server of the invention have been illustrated in detail with reference to the accompanied drawings, those skilled in the art can appreciate that various modifications and changes can be made without departing from the spirit and scope of the present invention. The scope of the present invention is limited only by the appended claims.

What is claimed is:

1. A method for creating archives on removable mass storage media, comprising:

the digitizing an archive from a new archive batch;

determining whether all archives in the new archive batch have been digitized and repeating the digitizing until all archives of the new archive batch have been digitized;

after all archives of the new archive batch have been digitized, collecting recorded data representing details about the archives of the new archive batch;

creating archive directory file of archives of the new archive batch;

determining whether a buffer is capable of holding the archives of the new archive batch and their directory files;

storing the archives of the new archive batch and their directory file in the buffer when the buffer is capable of holding the archives of the new archive batch and their directory files; and transferring the archives of the new archive batch and their directory file to removable mass storage medium when the buffer is not capable of holding the archives of the new archive batch and their directory files.

2. The method of claim 1 wherein the collecting recorded data further comprises storing the recorded data in a different archive directory file for each archive in the new archive batch.

3. A digital archive server for loading archives stored on a removable mass storage media into a database of a digital library, comprising:

the a buffer for storing data and;

the a mass storage media library driver for reading and writing data on removable mass storage media; and the an archive server for creating digitized archives on the removable mass storage media, the archive server digitizing an archive from a new archive batch, determining whether all archives in the new archive batch have been digitized and repeating the digitizing until all archives of the new archive batch have been digitized, after all archives of the new archive batch have been digitized, collecting recorded data representing details about the archives of the new archive batch, creating archive directory file of archives of the new archive batch, determining whether the buffer is capable of holding the archives of the new archive batch and their directory files, storing the archives of the new archive batch and their directory file in the buffer when the buffer is capable of holding the archives of the new archive batch and their directory files and transferring the archives of the new archive batch and their directory file to the removable mass storage medium when the buffer is not capable of holding the archives of the new archive batch and their directory files.

* * * * *